US008477750B2

(12) United States Patent
Agarwal et al.

(10) Patent No.: US 8,477,750 B2
(45) Date of Patent: Jul. 2, 2013

(54) CLASSIFICATION OF WIRELESS LAN SIGNALS

(75) Inventors: Kunal Agarwal, Mumbai (IN); Baijayanta Ray, Bangalore (IN); Abhay Samant, Bangalore (IN)

(73) Assignee: National Instruments Corporation, Austin, TX (US)

( * ) Notice: Subject to any disclaimer, the term of this patent is extended or adjusted under 35 U.S.C. 154(b) by 231 days.

(21) Appl. No.: 13/109,311

(22) Filed: May 17, 2011

(65) Prior Publication Data
US 2012/0026994 A1    Feb. 2, 2012

(51) Int. Cl.
*H04W 4/00*    (2009.01)
(52) U.S. Cl.
USPC ............................ 370/338; 370/344; 375/140
(58) Field of Classification Search
USPC .................................. 370/338, 344; 375/140
See application file for complete search history.

(56) References Cited

U.S. PATENT DOCUMENTS

| | | | | |
|---|---|---|---|---|
| 8,121,017 | B2 * | 2/2012 | Stadelmeier et al. | 370/203 |
| 2006/0160545 | A1 * | 7/2006 | Goren et al. | 455/456.1 |
| 2007/0211624 | A1 * | 9/2007 | Schmidt et al. | 370/225 |
| 2008/0192810 | A1 * | 8/2008 | Razzell et al. | 375/150 |
| 2009/0110033 | A1 * | 4/2009 | Shattil | 375/141 |
| 2009/0122840 | A1 * | 5/2009 | Quagliaro | 375/146 |
| 2009/0161735 | A1 * | 6/2009 | Okada | 375/150 |

OTHER PUBLICATIONS

Barker code, from Wikipedia, the free encyclopedia, http://en.wikipedia.org/wiki/Barker_code, 3 pages. [Retrieved Oct. 24, 2011].
Direct-sequence spread spectrum, from Wikipedia, the free encyclopedia, http://en.wikipedia.org/wiki/Direct-sequence_spread_spectrum, 4 pages. [Retrieved Oct. 24, 2011].
IEEE 802.11, from Wikipedia, the free encyclopedia, http://en.wikipedia.org/wiki/IEEE_802.11, 8 pages. [Retrieved Oct. 24, 2011].
Orthogonal frequency-division multiplexing, from Wikipedia, the free encyclopedia, http://en.wikipedia.org/wiki/Orthogonal_frequency-division_multiplexing, 12 pages. [Retrieved Oct. 24, 2011].

* cited by examiner

*Primary Examiner* — Kenny Lin
(74) *Attorney, Agent, or Firm* — Meyertons Hood Kivlin Kowert & Goetzel, P.C.; Jeffrey C. Hood; Mark K. Brightwell

(57) ABSTRACT

A system and method for classifying an input signal suspected of being a wireless LAN signal. Bursts are isolated based on an analysis of an average power signal that is derived from the input signal. A correlation-based test is performed to determine if the input signal contains a Barker code typical of DSSS transmissions. Another correlation-based test is performed to determine of the input signal contains a long training sequence typical of OFDM transmissions. The results of the two tests are used to classify the input signal as being DSSS, OFDM or neither.

24 Claims, 7 Drawing Sheets

CLASSIFICATION OF WIRELESS LAN SIGNALS

RELATED APPLICATION DATA

This application claims the benefit of priority under 35 U.S.C. 119 to Indian Provisional Application No. 1794/DEL/2010, filed with the Patent Office of India on Jul. 30, 2010, titled "Various Receiver Systems and Methods", and invented by Baijayanta Ray, Nikhil Ashok Deshmukh, Pratik Prabhanjan Brahma, Ankit Sethi, Kunal Agarwal, Sartaj Chaudhury, and Utkarsh Gupta. That Provisional Application is hereby incorporated by reference in its entirety as though fully and completely set forth herein.

FIELD OF THE INVENTION

The present invention relates to the field of telecommunication, and more particularly, to systems and methods for intercepting a wireless LAN signals and classifying them as being direct sequence spread spectrum (DSSS), orthogonal frequency-division multiplexed (OFDM), or neither.

DESCRIPTION OF THE RELATED ART

Computers may be equipped to send and/or receive wireless signals in order to communicate information. In particular, computers may be equipped to send/receive signals according to any of one or more wireless LAN standards. (LAN is an acronym for "local area network".) According to some wireless LAN standards, direct sequence spread spectrum (DSSS) is specified as the modulation mechanism. According to other wireless LAN standards, orthogonal frequency-division multiplexing (OFDM) is specified as the modulation mechanism. In some situations, a receiver may not know whether a received signal is a DSSS signal, an OFDM signal or neither. Thus, there exists a need for systems and methods capable of analyzing a received signal in order to classify the received signal as being DSSS, OFDM or neither.

SUMMARY

This patent describes a method for classifying a received burst of an input signal as belonging to a DSSS signal or not. The method may involve the following operations. The operations may be performed by a computer system, e.g., a computer system that is coupled to (or incorporated within) a receiver.

The computer system may receive an input signal. The input signal includes a sequence of samples that have been captured by an analog-to-digital converter (ADC).

The computer system may detect a start location and stop location of a burst within the input signal based on an average power signal that is derived from the input signal. For example, the computer system may scan the average power signal for a time interval long enough to be a DSSS burst and over which the average power signal exceeds a power threshold. The beginning and end of that interval define the start location and the stop locations of the burst.

The computer system may compute a correlation function based on (a) samples of the input signal corresponding to at least a portion of the burst and (b) a known Barker code of a direct sequence spread spectrum (DSSS) standard (e.g., one of the 802.11 standards). The correlation function is a function of shift index. The value of the correlation function at any given value of the shift index may be determined by computing inner products between respective windows of the samples and the Barker code and by computing a sum of magnitudes of the inner products. The respective windows are shifted relative to an initial series of windows by an amount equal to the shift index value. The "magnitude" of an inner product may be computed by taking the absolute value or the square of the inner product.

The computer system may determine whether or not the correlation function includes two peaks with amplitude greater than a magnitude threshold and separated by a sample distance equal to a known sample distance between successive DSSS symbols.

The computer system may output a decision indicating whether or not the burst corresponds to a DSSS signal based on the Boolean result (i.e., the True/False result) of the action of determining whether or not the correlation function includes the two peaks. In other words, if the computer system determines that the correlation function includes the two peaks, the computer system outputs the decision that the burst corresponds to a DSSS signal. In contrast, if the computer system determines that the correlation function does not include the two peaks, the computer system outputs the decision that the burst does not correspond to a DSSS signal.

This patent also describes a method for classifying a received burst of an input signal as belonging to an OFDM signal or not. The method may involve the following operations. The operations may be performed by a computer system, e.g., a computer system that is coupled to (or incorporated within) a receiver.

The computer system may receive an input signal. The input signal includes a sequence of samples captured by an analog-to-digital converter (ADC).

The computer system may detect a start location and stop location of a burst within the input signal based on an average power signal derived from the input signal. The start location and stop location may be determined from the average power signal. For example, the computer system may scan the average power signal for a time interval long enough to be an OFDM burst and over which the average power signal exceeds a power threshold. The beginning and end of that interval define the start location and the stop locations of the burst.

The computer system may compute a correlation function between a template and a set of samples of the input signal corresponding to the burst (or a portion of the burst). The template represents a training sequence of a preamble that conforms to an OFDM standard (e.g., one of the 802.11 standards). The training sequence includes two repetitions of a base pattern. For example, the training sequence may be the long training sequence specified by one of the 802.11 OFDM standards.

The computer system may determine whether or not the correlation function includes three peaks with: (a) amplitude greater than an amplitude threshold and (b) interpeak spacing corresponding to a known symbol distance between the two repetitions of the base pattern.

In response to determining that the correlation function includes the three peaks, the computer system may perform an autocorrelation analysis on a selected portion of the burst to determine whether or not the selected portion corresponds to an instance of the training sequence.

The computer system may output a decision indicating whether or not the burst corresponds to an OFDM signal based on the Boolean result of the action of determining whether or not the selected portion corresponds to an instance of the training sequence. In other words, if the computer system determines that the selected portion corresponds to an instance of the training sequence, the computer system may output the decision that the burst corresponds to an OFDM signal. In contrast, if the computer system determines that the selected portion does not correspond to an instance of the training sequence, the computer system may output the decision that the burst does not correspond to an OFDM signal.

This patent also describes a method for classifying a received burst of an input signal as belonging to a DSSS signal, an OFDM signal or neither. This method may involve the following operations. The operations may be performed by a computer system, e.g., a computer system that is coupled to (or incorporated within) a receiver.

The computer system may receive an input signal, e.g., a discrete-time signal captured by an analog-to-digital converter (ADC).

The computer system may detect a start location and stop location of a burst within the input signal based on an average power signal derived from the input signal.

The computer system may compute a correlation function $R_1$ based on (a) samples of the input signal that correspond to at least a portion of the burst and (b) a known Barker code of a direct sequence spread spectrum (DSSS) standard, e.g., one of the 802.11 standards.

The computer system may determine whether or not the correlation function $R_1$ includes two peaks with amplitude greater than a first threshold $T_1$ and separated by a sample distance equal to a known sample distance between successive DSSS symbols.

The computer system may determine whether or not the burst contains a known training sequence conforming to an OFDM standard (e.g., one of the 802.11 standards). The known training sequence includes two repetitions (e.g., two adjacent repetitions) of a base pattern. For example, the training sequence may be a long training sequence defined by one of the 802.11 standards appropriate for OFDM transmission.

The computer system may classify the burst as corresponding to a DSSS signal, an OFDM signal or neither based on whether or not the correlation function $R_1$ includes the two peaks and based on whether or not the burst contains the known training sequence.

BRIEF DESCRIPTION OF THE DRAWINGS

A better understanding of the present invention can be obtained when the following detailed description of the preferred embodiments is considered in conjunction with the following drawings.

Figure 1:
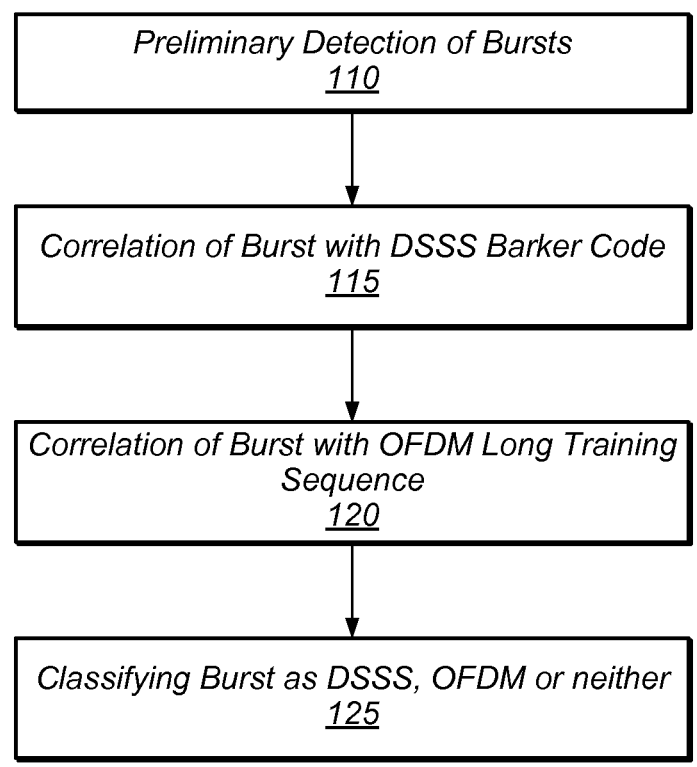
FIG. 1 shows one embodiment of a method for classifying wireless LAN signals.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM; various media based on the storage of electrical charge and/or other physical quantities; media fabricated using various lithographic techniques; etc. The term "memory medium" may also include a set of two or more memory media that reside at different locations, e.g., at different computers that are connected over a network.

Programmable Hardware Element—a hardware device that includes multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning As used herein, the term "program" includes within its scope of meaning: 1) a software program which is stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor or computer system. Exemplary software programs include: programs written in text-based programming languages such as C, C++, Java™, Pascal, Fortran, Perl, etc.; graphical programs (programs written in graphical programming languages); assembly language programs; programs that have been compiled to machine language; scripts; and other types of executable software. A software program may comprise two or more subprograms that interoperate in a specified manner.

Hardware Configuration Program—a program, e.g., a netlist or bit file, that can be used to program or configure a programmable hardware element.

Graphical Program—A program comprising a plurality of interconnected nodes or icons, where the plurality of interconnected nodes or icons visually indicate the functionality of the program. A graphical program is a type of diagram.

The following provides examples of various aspects of graphical programs. The following examples and discussion are not intended to limit the above definition of graphical program, but rather provide examples of what the term "graphical program" encompasses.

The nodes in a graphical program may be connected in one or more of a data flow, control flow, and/or, execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as a receiver (e.g., a receiver specialized for receiving wireless LAN signals) or a receiver front end, a signal processing board, a modem, a network interface (e.g., a wireless network interface), a unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, where the connections between the nodes indicate that data produced by one node is used by another node.

Node—In the context of a graphical program, an element that may be included in a graphical program. A node may have an associated icon that represents the node in the graphical program, as well as underlying code and/or data that implements functionality of the node. Exemplary nodes include function nodes, sub-program nodes (sub-VIs), terminal nodes, structure nodes, etc. Nodes may be connected together in a graphical program by connection icons or wires.

Graphical User Interface—this term is intended to have the full breadth of its ordinary meaning The term "Graphical User Interface" is often abbreviated to "GUI". A GUI may include one or more input GUI elements, one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses.

A GUI may comprise a single window having one or more GUI Elements, or may comprise more than one window, each having one or more GUI Elements.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and that enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input, and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, switches, text input boxes, numeric input fields, etc.

Output Indicator—a graphical user interface element for displaying output from a program. Exemplary output indicators include charts, graphs, gauges, text output boxes, numeric displays, etc. An output indicator is sometimes referred to as an "output control".

Computer System—any of various types of computing or processing systems, including a personal computer (PC), a mainframe computer system, a workstation, a laptop, a tablet computer, a network appliance, an Internet appliance, a handheld or mobile device, a personal digital assistant (PDA), a television system, a grid computing system, or other device or combinations of devices. In general, the term "computer system" can be broadly defined to encompass any device (or combination of devices) having at least one processor that is configured to execute instructions that are stored on a memory medium.

Measurement Device—includes instruments, data acquisition devices, smart sensors and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card, a video capture board, a smart camera, a motion control device, a robot having machine vision, and other similar types of devices. Exemplary "stand-alone" instruments include oscilloscopes, multimeters, signal analyzers, signal demodulators, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, e.g., may receive and analyze data, and issue automation control signals in response.

Embodiments of the present inventions may be realized in any of various forms. For example, any of the present inventions may be realized as a computer-implemented method, a computer-readable memory medium, or a computer system. Furthermore, any of the present inventions may be realized using one or more custom-designed hardware devices such as ASICs and/or one or more programmable hardware elements such as FPGAs.

A computer-readable memory medium is a memory medium that stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may include a processor (or a set of processors) and a memory medium. The memory medium stores program instructions. The processor is configured to read and execute the program instructions from the memory medium. The program instructions are executable by the processor to implement a method, e.g., any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a tablet computer, a wearable computer, a computer integrated in a head-mounted display, etc.

In some embodiments, a set of computers distributed across a computer network may be configured to partition the effort of executing a computational method (e.g., any of the method embodiments disclosed herein).

In some embodiments, a first computer may be configured to receive a wireless LAN signal, down-convert the wireless LAN signal to baseband, and capture samples of the wireless LAN signal. The first computer may send the captured samples to a second computer through the computer network. The second computer may operate on the signal samples according to any of the method embodiments described herein, or, any combination of the method embodiments described herein, or, any subset of any of the method embodiments described herein, or, any combination of such subsets.

The following is a list of acronyms used herein.

| | |
|---|---|
| DSSS | Direct-Sequence Spread-Spectrum |
| LAN | Local Area Network |
| Msps | MegaSamples per second |
| OFDM | Orthogonal Frequency-Division Multiplexing |
| WLAN | Wireless LAN |

In some embodiments, the present invention is directed to a method for classifying frames that are received by a receiver (e.g., a signal interceptor system) in a wireless LAN (WLAN) system. The wireless LAN system may have one or more of the following transmission characteristics.

1. Information is transmitted in arbitrary-length frames and at irregular intervals.

2. The transmission medium has a coherence bandwidth that is significantly lower than the signal bandwidth.

3. White thermal noise of unknown power spectral density is added to the received signal at the receiver front end.

The receiver scans (e.g., slides) a frequency window through a user-defined frequency band (for example the IEEE 2.4 GHz frequency band) to determine where in the frequency band a WLAN signal is being transmitted or where signal energy characteristic of a WLAN signal-transmission is present. The power within the window may be computed as a function window position within the frequency band. The receiver may determine a window position where the power function is maximized and where there is a significant null at the center of the window. (A WLAN signal would typically have a null at its center frequency.) The frequency position of the window satisfying these criteria may be taken as an estimate of the center frequency of the WLAN signal. The width of the frequency window may be set equal to a maximum of the expected bandwidths of the WLAN signals to be received or analyzed or classified. In one embodiment, the width of the frequency window is specified by a user, e.g., via a graphical user interface.

After estimating the center frequency of a candidate WLAN signal, IQ samples are acquired, e.g., at an IQ rate significantly higher than the bandwidth of the frequency window. The samples are acquired at the estimated center frequency. ("IQ samples" are complex-valued samples, each having an in-phase component I and quadrature component Q.)

The noise floor of the receiver may be estimated, e.g., by any one or more of the following three methods.

(A) Measuring the in-band power over a portion of the user-defined frequency band that is known to be transmission free.

(B) Measuring the power over the user-defined frequency band by blocking out any transmitted signal from being received by the receiver by putting in a high value attenuator at the input of the receiver.

(C) Offline calibration over the user-defined frequency band.

Burst detection is carried out on the acquired WLAN signal to detect bursts (i.e., frames) contained in the WLAN signal and to remove the inter-burst idle intervals. Each such detected burst is further analyzed and classified as being: a DSSS (802.11b/g or any other variant) burst, an OFDM (802.11a/g/n or any other variant) burst, or neither.

In some embodiments, the classification process relies on one or more of the following assumptions: each DSSS frame will have the long SYNC field and/or the short SYNC field defined in Section 18.2.2 of IEEE 802.11-2007 standard; and each OFDM frame will have the short training sequence (STS) and/or the long training sequence (LTS) defined in Section 17.3.3 of IEEE 802.11-2007 standard.

FIG. 1 shows one embodiment of a method performed by the receiver. The method includes a preliminary detection process 110 to detect bursts in the received signal; a correlation process 115 that involves correlating with a DSSS Barker code; a correlation process 120 that involves correlating with an OFDM long training sequence; and a process 125 of classifying the received signal as being DSSS, OFDM or neither based on the results of the correlation processes 115 and 120.

Preliminary Detection of Bursts (110)

Since the acquired WLAN signal (i.e., the sampled WLAN signal) is composed of bursts of arbitrary length and occurring at irregular intervals, the receiver operates on the acquired WLAN signal to detect the approximate start and end of each burst. This burst-detection operation may be performed as follows.

1) Average power of the acquired samples over a moving window of user-defined length is computed. The choice of the length of the window determines the accuracy of the location of the detected start and stop locations of each burst. A smaller window may locate the start of the burst more accurately, but at the cost of increased noise sensitivity resulting in false detection. A larger window may be more effective in reducing the false positives due to noise, but at the cost of reduced accuracy. In one embodiment, a window of length 1 microsecond duration was chosen and found to give satisfactory results for an indoor environment where the receiver was placed at a distance of 25 feet from a wireless access point.

2) The noise floor can be estimated using any of the three above-stated mechanisms. In one embodiment, the noise floor was estimated using the first method (A), which is described in more detail below.

Samples of noise are acquired for a sufficiently long duration in a band (e.g., a 20 MHz band) centered at a frequency that is known to be free of any transmitted signal so that the statistical properties computed from the acquired samples are reliable. In one embodiment, an acquisition duration of 10 milliseconds was found to be sufficient for this purpose. The receiver noise floor may be computed from the average power of the acquired noise samples.

3) Average power for every window is then compared with the estimated noise floor and if a contiguous sequence of windows lasting for at least 20 microseconds (which is the minimum possible duration of a WLAN burst as defined in the current 802.11 standards) and having power at least 3 dB above noise power (or a certain user-defined amount above noise power) is present, it is marked as a WLAN burst, with the position of the first of windows being marked as the start of a burst. When a window is detected for which the average power dips below the above-defined threshold, the position of this window is marked as the end of the burst. This process is carried out for the entire acquired waveform to isolate the bursts.

Determination of Precise Starting Point of Burst and Type Classification

To classify the burst as DSSS, OFDM or neither, two tests (one for DSSS and another for OFDM) are performed on each detected burst. The two tests are (a) a correlation test with a known Barker code and (b) a correlation test with the known OFDM preamble.

Depending on which tests are passed, a detected burst is classified as DSSS or OFDM or neither. If the DSSS test is passed, the burst is classified as a DSSS burst. Being a correlation-based test, the DSSS test will give a precise start location of the DSSS burst. If the OFDM test is passed, the burst is classified as an OFDM burst. Being a correlation-based test, the OFDM test will give a precise start location of the OFDM burst. If neither test is passed, the burst may be classified as being neither a DSSS burst nor an OFDM burst. The operations involved in each test are explained below.

Correlation Test with the Barker Code (115)

1) The acquired burst is resampled to at least the Nyquist rate for DSSS bursts (which is 11 Msps in the current 802.11 standards).

2) From the preliminary burst detection process, the approximate starting location of a burst is already known. Since the preamble of a DSSS burst is a series of inverted or non-inverted versions of the Barker code, the action of correlating with the Barker code and computing the square (or absolute value) of the correlation function will give a peak wherever the start of the Barker code is aligned with the start of a symbol. In 802.11, the Barker code is an 11-bit sequence given by 10110111000. However, it should be noted that the present inventions are not limited to any one realization of the Barker code. In different embodiments, the Barker code may have a different bit lengths and different bit patterns.

Figure 2:
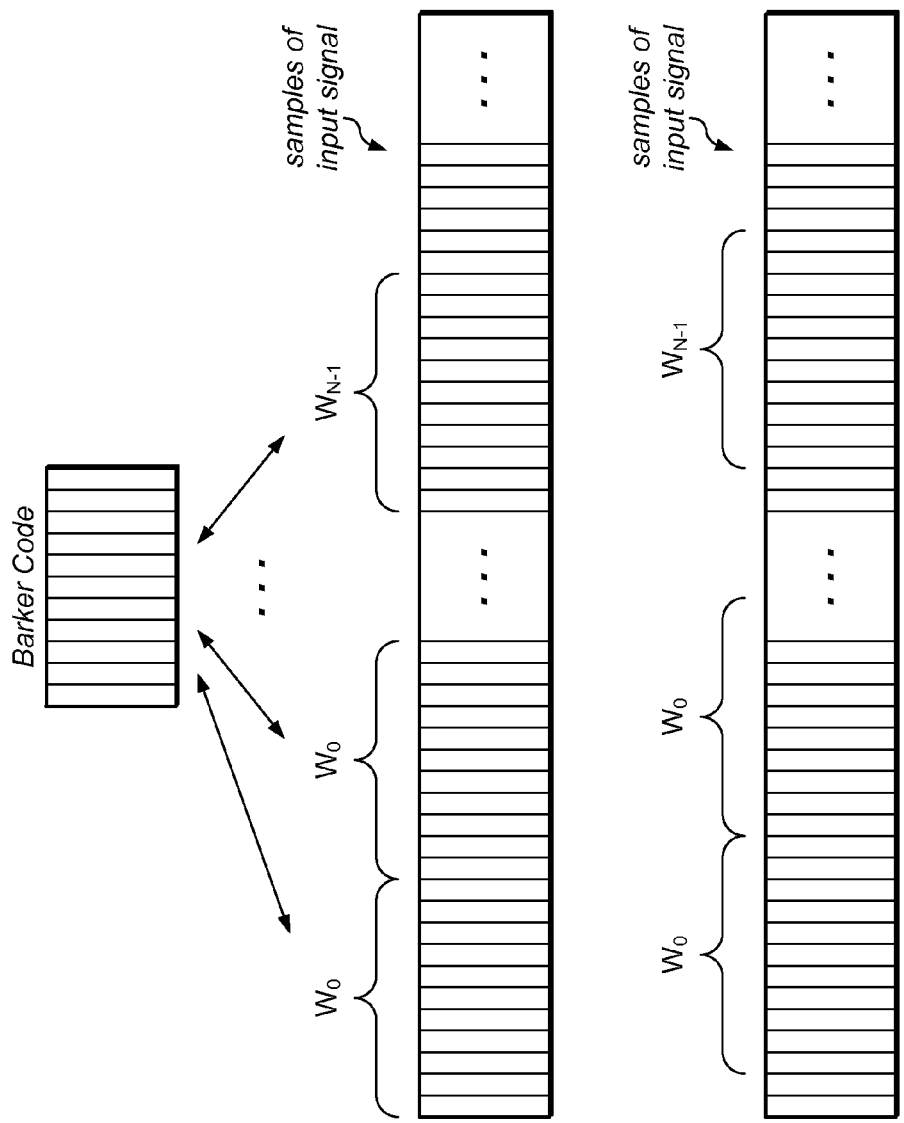
FIG. 2 illustrates a series of windows of sample data that are used to perform correlation against the Barker code according to one embodiment.

3) Starting at the burst start location provided by the preliminary burst detector (or a number of samples prior to that location), a correlation sum, i.e., inner product, is computed between the Barker code and each of a series of windows of the resampled signal, each window being the same sample width as the Barker code. The series of windows is shown in FIG. 2, where they are denoted as $W_0, W_1, \ldots, W_{N-1}$. (N is the number of windows.) The squares of the correlation sums are added, giving a result R(0). All the windows are shifted by one sample position; the correlation sums against the Barker code are recomputed; and the sum of the correlation sums are added again, giving a result R(1). All the windows are shifted again by one sample position (amounting to two sample positions from the beginning); the correlation sums against the Barker code are recomputed; and the sum of the correlation sums are added again, giving a result R(2). The lower portion of FIG. 2 shows the configuration of the windows appropriate for the computation of R(2). (The windows have been shifted by two positions from the original configuration shown in the middle portion of FIG. 2.) Repeating in this fashion gives a correlation function R as a function of sample offset (i.e., shift distance) of the series of windows. The correlation function exhibits a peak wherever the Barker code is aligned with the start of the burst, and exhibits significantly lower amplitudes at any other offset which is not a multiple of 11 in distance from the start of the burst. In one embodiment, the sample set size (i.e., the number of samples of the resampled signal used to perform the correlation) was equivalent to 56 DSSS symbols. Of course, other values of the sample set size may be used. In general, it is preferable to choose a sample set size large enough so that a peak, if it occurs, is considerably larger than the correlation amplitudes when not aligned with the start of a symbol.

4) In some embodiments, the correlation amplitudes R(k) may be computed for at least 22 consecutive values of the sample offset to ensure that alignment with the start of a symbol happens exactly twice (once at the start of the burst and again at the next symbol). Thus, the deciding criteria for a DSSS burst may be the existence of two large peaks separated by sample distance equal to 11. In one embodiment, a peak is said to be "large" if its amplitude is greater than a threshold $T_1$.

In case of multipath, an additional set of peaks will be observed in the correlation function for each path component in addition to the dominant path. The peaks of each additional set will be separated by sample distance equal to 11. For example, if there is one path in addition to the dominant path, a secondary set of peaks will be observed in addition to the dominant set of peaks. These additional sets of peaks caused by multipath may be removed as follows. First, detect the location of a maximum in the correlation function and then set to zero the amplitude of neighboring points in the correlation function. (In some embodiments, the radius of the neighborhood over which the zeroing is performed may be determined based on a maximum expected delay spread of the multipath components.) In the altered correlation function, the location of a second maximum is detected and neighboring points in the altered correlation function are set to zero. The locations of the two maxima will be the locations of peaks correspond to the dominant path.

Correlation Test with the OFDM Long Training Sequence (120)

1) The acquired burst is resampled to a given sample rate, e.g., a rate higher than the Nyquist rate for the OFDM bursts. In one embodiment, the acquired bursts are resampled at 20 Msps.

2) From the preliminary burst detection, the approximate starting location of a burst is known. Since the long training sequence (LTS) in the OFDM preamble under any of the OFDM based 802.11 standards is a series of three consecutive blocks having a structure represented by the triplet (32, 64, 64). In other words, the LTS has a first block a length 32 symbols, a second block of length 64 symbols, and a third block of length 64 symbols. The second and third blocks are identical. Thus, a correlation of the resampled signal with the LTS (i.e., a version of the LTS matching the sample rate of the resampled signal) should give multiple peaks if the resampled burst corresponds to an OFDM burst. Since the LTS is made of larger blocks than the short training sequence (STS), it has a better correlation property than the STS and will give fewer peaks upon correlation.

3) An ideal OFDM preamble is generated by the receiver (at the same rate to which the acquired burst was resampled). The structure of the ideal OFDM preamble is known from a communication standard, e.g., one of the 802.11 standards.

4) The LTS portion of the generated OFDM Preamble is extracted and correlated with the resampled burst under consideration.

5) A maximum and two secondary peaks (one secondary peak on each side of the maximum peak) in the correlation at offsets of 64 symbols will be observed if the resampled burst includes an OFDM preamble. The position of the maximum peak defines the location of the start of the OFDM preamble in the resampled burst.

6) In some embodiments, to confirm the presence of the OFDM preamble, its auto-correlation property is used. Within the resampled burst under consideration, the last block of the LTS portion of the supposed OFDM preamble is extracted and is correlated with the whole of the supposed OFDM preamble. Since the last two blocks in an LTS are the same, this auto-correlation should give two large peaks separated by 64 symbols if the supposed OFDM preamble is an actual OFDM preamble, where "large" means that the amplitude of each peak is greater than a threshold $T_2$. A resampled burst that passes this confirmation test may be categorized as belonging to an OFDM signal.

Multiple OFDM Bursts Separated by Spurious Signals

During acquisition of the IQ samples of the WLAN signal, if there is an unwanted transmission from other sources in the same frequency band and occurring at the same time that an actual OFDM burst is being transmitted, the power level between two transmitted OFDM bursts may remain high enough so that the two different bursts may be mistakenly identified as one burst by the preliminary burst detection. In this case, the above-described correlation analysis based on the OFDM preamble will successfully determine the location of the OFDM preamble in the first actual burst of the detected burst. To determine the existence and location of a second actual burst within the detected burst, a detected burst that has been classified as an OFDM burst may be subjected to further processing as follows. The receiver-generated OFDM preamble is correlated with the whole of the resampled burst. The triplet of peaks corresponding to the first OFDM preamble are removed from the correlation function, and then the modified correlation function is searched for a triplet of peaks resulting from a second OFDM preamble (i.e., an OFDM preamble of a second burst within the detected burst). The presence of such a triplet indicates the presence of the second burst. Furthermore, the location of the triplet in the modified correlation defines the start location of the second burst in the detected burst.

Classifying the Burst as DSSS, OFDM or Neither (125)

Based on the results of the DSSS test (115) and the OFDM test (120), the receiver classifies the acquired signal as being DSSS, OFDM or neither. In particular, if the DSSS test is passed and the OFDM test is failed, the acquired signal is classified as being DSSS; if the DSSS test is failed and the OFDM test is passed, the acquired signal is classified as being OFDM; if both tests are failed, the acquired signal is classified as being neither DSSS nor OFDM.

Figure 3:
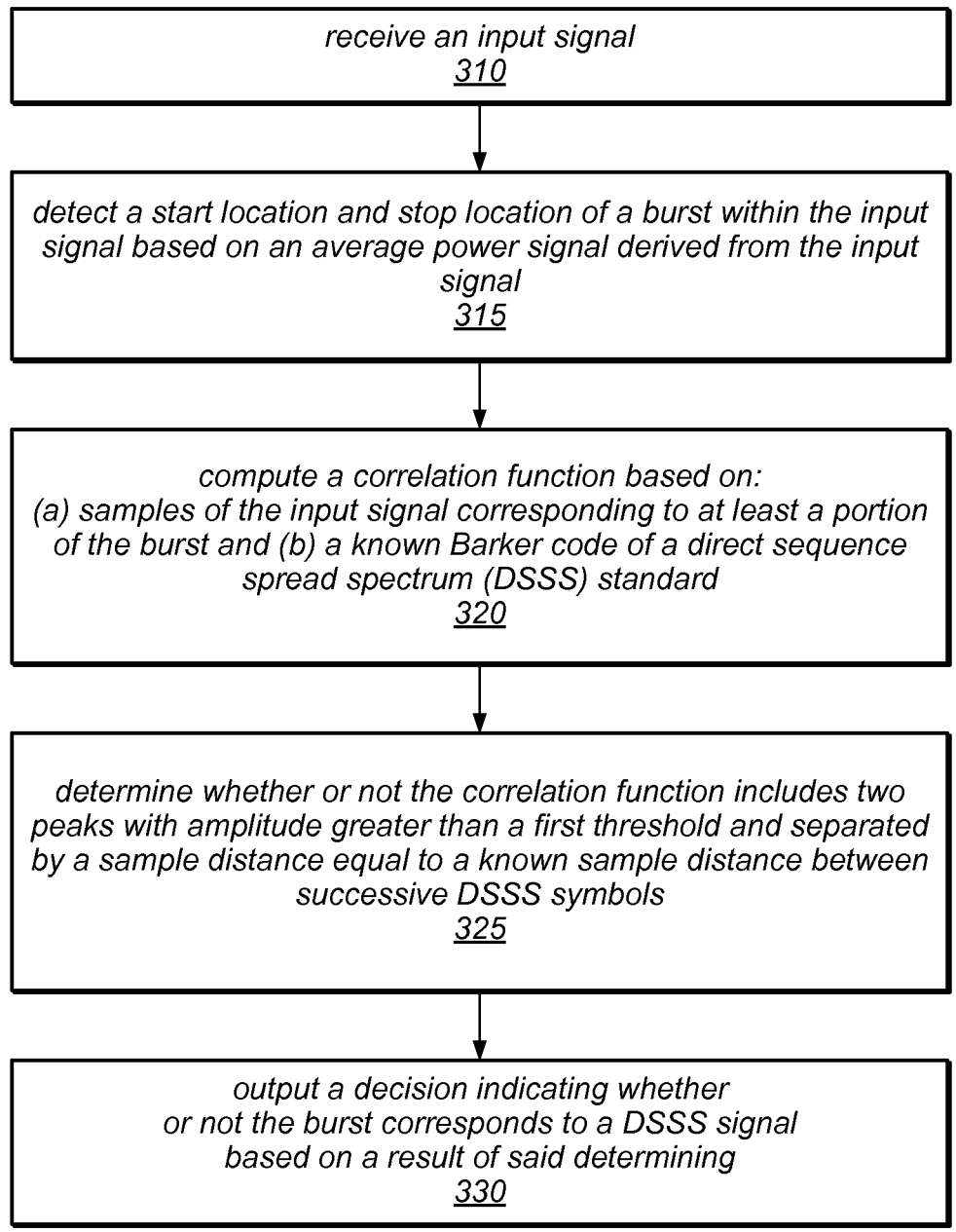
FIG. 3 is a flowchart illustrating one embodiment of a method for classifying a received signal burst as belonging to a DSSS signal or not.

In one set of embodiments, a method for classifying a detected burst of an input signal as corresponding to a DSSS signal or as not corresponding to a DSSS signal may involve the operations shown in FIG. 3. The operations may be performed by a computer system, e.g., a computer system that is coupled to (or incorporated within) a receiver.

At 310, the computer system may receive an input signal. The input signal is a sequence of samples captured by an analog-to-digital converter (ADC), e.g., as described above.

At 315, the computer system may detect a start location and stop location of a burst within the input signal based on an average power signal derived from the input signal. The average power signal may be computed, e.g., as variously described above. The start location and stop location may be determined from the average power signal, e.g., as variously described above.

At 320, the computer system may compute a correlation function based on (a) samples of the input signal corresponding to at least a portion of the burst and (b) a known Barker code of a direct sequence spread spectrum (DSSS) standard (e.g., one of the 802.11 standards). The correlation function is a function of shift index. As variously described above, the value of the correlation function at any given value of the shift index may be determined by computing inner products between respective windows of the samples and the Barker code and by computing a sum of magnitudes of the inner products. The respective windows are shifted relative to an initial series of windows by an amount equal to the shift index value. The "magnitude" of an inner product may be computed by taking the absolute value or the square of the inner product.

At 325, the computer system may determine whether or not the correlation function includes two peaks with amplitude greater than a first threshold and separated by a sample distance equal to a known sample distance between successive DSSS symbols. This action of determining whether or not the correlation function includes the two peaks may be performed, e.g., as variously described above.

At 330, the computer system may output a decision indicating whether or not the burst corresponds to a DSSS signal based on the Boolean result of said determining, i.e., of operation 325. In other words, if the computer system determines that the correlation function includes the two peaks, the computer system outputs the decision that the burst corresponds to a DSSS signal. In contrast, if the computer system determines that the correlation function does not include the two peaks, the computer system outputs the decision that the burst does not corresponds to a DSSS signal.

In one embodiment, the computer system may output a graphical indication of the decision to a display device. In another embodiment, the computer system may output an indication of the decision to a demodulation processor so the demodulation processor will know whether or not to apply DSSS demodulation to the burst.

In some embodiments, the computer system may resample the burst (or the input signal) to a Nyquist rate that is specified for DSSS signals conforming to the DDDS standard. The resampling may be performed prior to the action of computing the correlation function.

In some embodiments, in response to determining that the correlation function includes the two peaks, the computer system may demodulate the burst to obtain information bits. The action of demodulating the burst includes applying the Barker code to successive blocks of samples of the burst. (The position of the two peaks in the correlation function defines the symbol timing for the application of the Barker code. In other words, the start time of each symbol in the burst is defined by the position of the two peaks.) The information bits may be output to an output device. In one embodiment, the computer system may generate an output signal (e.g., a video signal and/or an audio signal) based on the information bits and provide the output signal to an output device such as a display device and/or a speaker.

In some embodiments, the action of detecting the start location and the stop location of the burst within the input signal may include computing the average power signal by moving a sample window through the input signal and computing an average power for each position of the window throughout the window movement.

In some embodiments, the action of determining whether or not the correlation function includes the two peaks may include: locating within the correlation function a first peak of largest amplitude; removing from a neighborhood of the first peak any lower amplitude peaks in order to obtain a modified correlation; locating within the modified correlation a second peak of second largest amplitude; and determining whether the first peak and the second peak have amplitude greater than the first threshold and are separated by the sample distance between successive DSSS symbols. (See, e.g., the discussion above regarding the removal of secondary peaks.)

Figure 4:
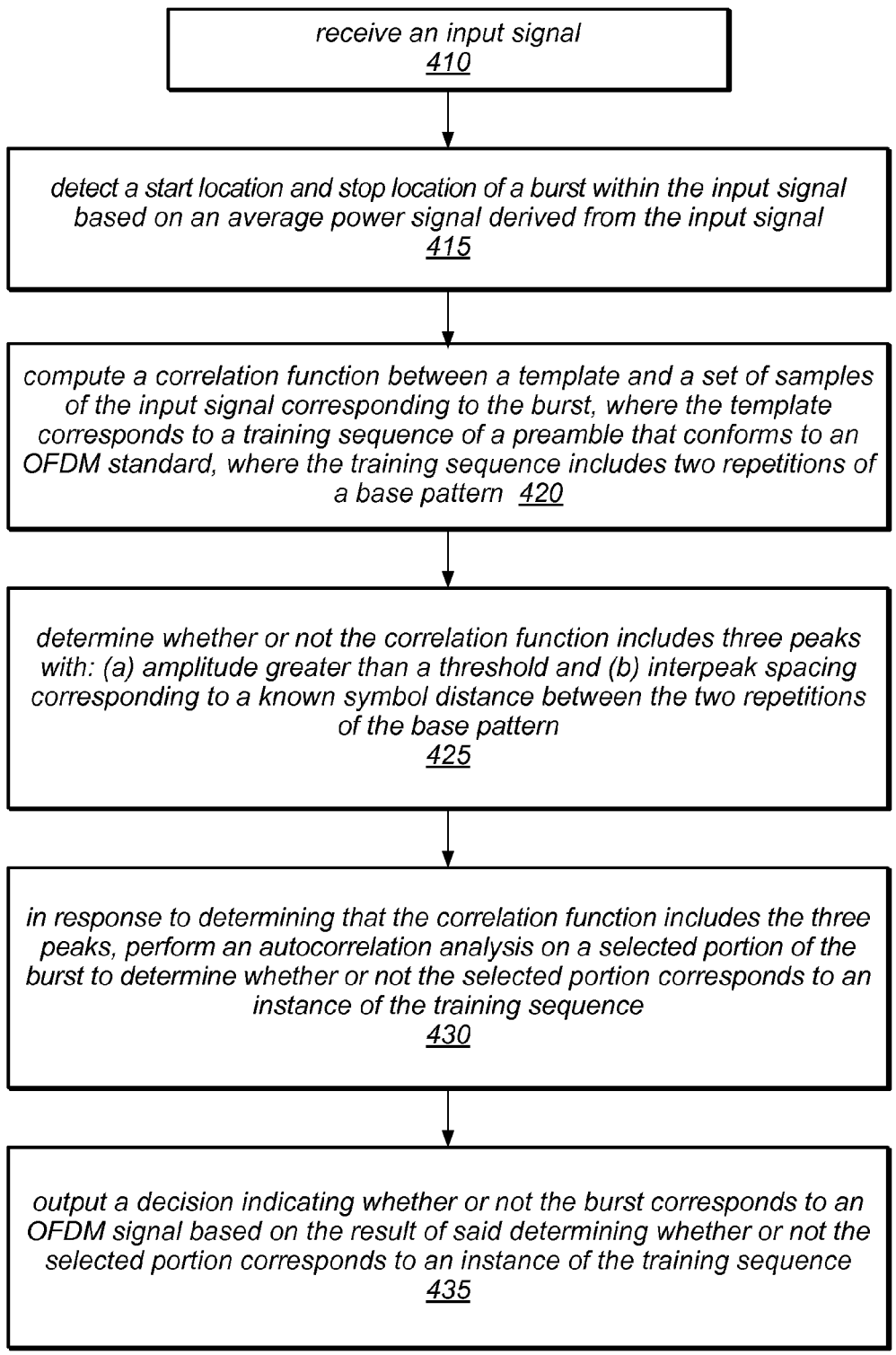
FIG. 4 is a flowchart illustrating one embodiment of a method for classifying a received signal burst as belonging to an OFDM signal or not.

In one set of embodiments, a method for classifying a detected burst of an input signal as corresponding to an OFDM signal or as not corresponding to an OFDM signal may involve the operations shown in FIG. 4. The operations may be performed by a computer system, e.g., a computer system that is coupled to (or incorporated within) a receiver.

At 410, the computer system may receive an input signal. The input signal is a sequence of samples captured by an analog-to-digital converter (ADC), e.g., as described above.

At 415, the computer system may detect a start location and stop location of a burst within the input signal based on an average power signal derived from the input signal. The average power signal may be computed, e.g., as variously described above. The start location and stop location may be determined from the average power signal, e.g., as variously described above.

At 420, the computer system may compute a correlation function between a template and a set of samples of the input signal corresponding to the burst, e.g., as variously described above. The template represents a training sequence of a preamble that conforms to an OFDM standard (e.g., one of the 802.11 standards). The training sequence includes two repetitions of a base pattern. For example, the training sequence may be the long training sequence specified by one of the 802.11 OFDM standards.

At 425, the computer system may determine whether or not the correlation function includes three peaks with: (a) amplitude greater than a threshold and (b) interpeak spacing corresponding to a known symbol distance between the two repetitions of the base pattern. (The interpeak spacing is said to correspond to the known symbol distance when both the spacing between the left and middle peaks of the three peaks and the spacing between the middle and right peaks of the three peaks agree with the known symbol distance.) This action of determining whether or not the correlation function includes three peaks may be performed, e.g., as variously described above.

At 430, in response to determining that the correlation function includes the three peaks, the computer system may perform an autocorrelation analysis on a selected portion of the burst to determine whether or not the selected portion corresponds to an instance of the training sequence. The autocorrelation analysis may be performed, e.g., as variously described above.

At 435, the computer system may output a decision indicating whether or not the burst corresponds to an OFDM signal based on the Boolean result of said determining whether or not the selected portion corresponds to an instance of the training sequence. In other words, if the computer system determines that the selected portion corresponds to an instance of the training sequence, the computer system may output the decision that the burst corresponds to an OFDM signal. In contrast, if the computer system determines that the selected portion does not correspond to an instance of the training sequence, the computer system may output the decision that the burst does not correspond to an OFDM signal.

In one embodiment, the computer system may output a graphical indication of the decision to a display device. In another embodiment, the computer system may output an indication of the decision to a demodulation processor so the demodulation processor will know whether or not to apply OFDM demodulation to the burst.

In some embodiments, the action of performing the autocorrelation analysis may include: extracting a hypothesized training sequence within the burst as the selected portion of the burst, where the action of extracting the hypothesized training sequence is based on a location of a middle one of said three peaks in the correlation function; performing an autocorrelation between a subsequence of the hypothesized training sequence and a whole of the hypothesized training sequence; and determining whether or not the autocorrelation includes two peaks with amplitude greater than a second threshold and having interpeak spacing that corresponds to the known symbol distance between the two repetitions of the base pattern. The subsequence of the hypothesized training sequence is a subsequence that would correspond to one of the repetitions of the base pattern if the hypothesized training sequence were indeed an instance of the training sequence.

In some embodiments, the computer system may resample the input signal (or the burst) at least to the Nyquist rate specified for OFDM signals conforming to the OFDM standard, e.g., as variously described above. The resampling is performed prior to the action of computing the correlation function.

In some embodiments, in response to determining that the selected portion of the burst corresponds to an instance of the training sequence, the computer system may demodulate the burst to recover input bits. The action of demodulating the burst conforms to the OFDM standard. The information bits may be output to an output device. In one embodiment, the computer system may generate an output signal (e.g., a video signal and/or an audio signal) based on the information bits and provide the output signal to an output device such as a display device and/or a speaker.

In some embodiments, in response to a decision that the burst corresponds to an OFDM signal, the computer system may search the correlation function for an additional set of three peaks with: (a) amplitude greater than the threshold and (b) interpeak spacing corresponding to the known symbol distance between the two repetitions of the base pattern. In response to detecting the additional set of three peaks in the correlation function, the computer system may output an indication of the existence of an additional burst having a start time defined by a position of the additional set of three peaks within the correlation function.

Figure 5:
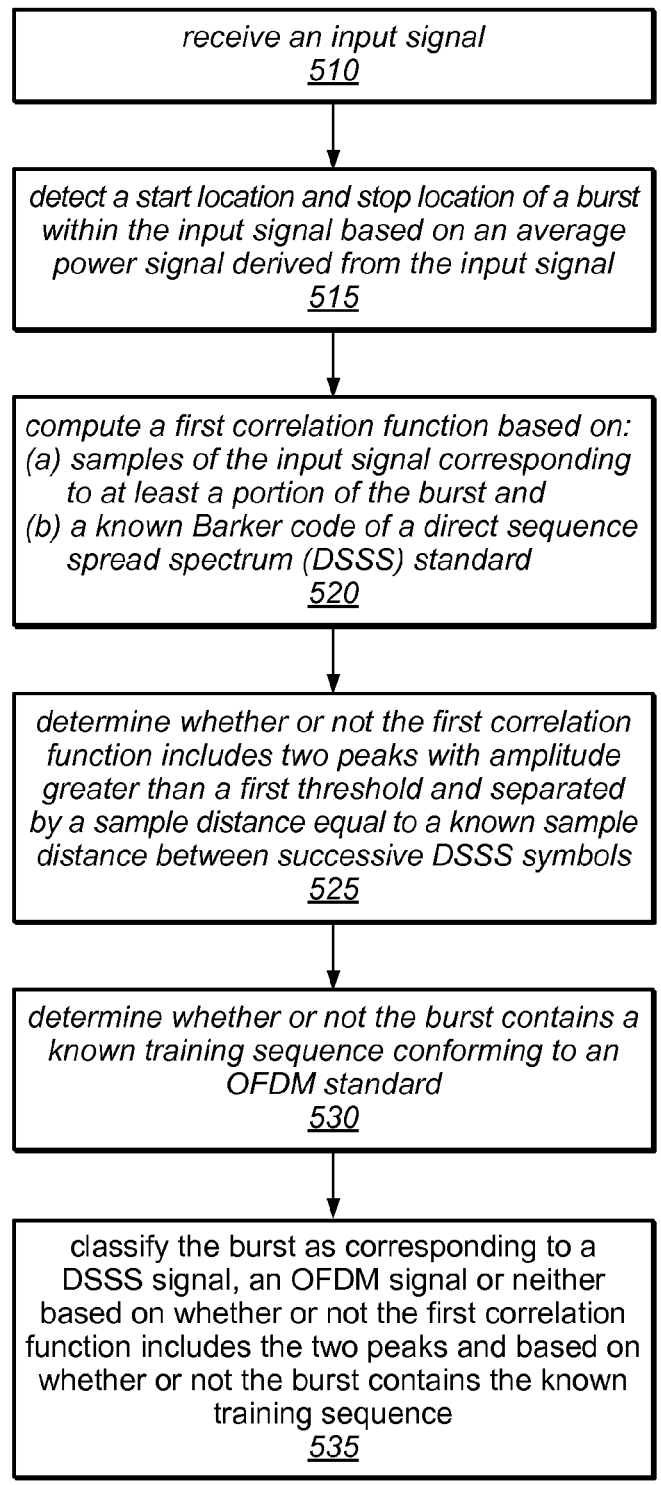
FIG. 5 is a flowchart illustrating one embodiment of a method for classifying a received signal burst as belonging to a DSSS signal, an OFDM signal or neither.

In one set of embodiments, a method for classifying a detected burst of an input signal as corresponding to a DSSS signal, an OFDM signal or neither may involve the operations shown in FIG. 5. The operations may be performed by a computer system, e.g., a computer system that is coupled to (or incorporated within) a receiver.

At 510, the computer system may receive an input signal, e.g., as variously described above.

At 515, the computer system may detect a start location and stop location of a burst within the input signal based on an average power signal derived from the input signal. The average power signal may be computed, e.g., as described variously above. The start location and stop location may be determined from the average power signal, e.g., as variously described above.

At 520, the computer system may compute a correlation function $R_1$ based on (a) samples of the input signal corresponding to at least a portion of the burst and (b) a known Barker code of a direct sequence spread spectrum (DSSS) standard, e.g., one of the 802.11 standards. The correlation function $R_1$ may be computed, e.g., as variously described above.

At 525, the computer system may determine whether or not the correlation function $R_1$ includes two peaks with amplitude greater than a first threshold $T_1$ and separated by a sample distance equal to a known sample distance between successive DSSS symbols. This determination may be performed, e.g., as variously described above.

At 530, the computer system may determine whether or not the burst (i.e., the burst detected in operation 515 above) contains a known training sequence conforming to an OFDM standard (e.g., one of the 802.11 standards). The known training sequence includes two repetitions (e.g., two adjacent repetitions) of a base pattern, e.g., as variously described above. For example, the training sequence may be a long training sequence having a (32,64,64) structure as described above.

At 535, the computer system may classify the burst as corresponding to a DSSS signal, an OFDM signal or neither based on whether or not the correlation function $R_1$ includes the two peaks and based on whether or not the burst contains the known training sequence.

In some embodiments, the computer system may output an indication of the classification of the burst. For example, the computer system may output a graphical indication of the classification to a display device. In one embodiment, the computer system may automatically display a graphical user interface appropriate for the classified burst type (i.e., a DSSS interface in the case that the burst is classified as being DSSS, or an OFDM interface in the case that the burst is classified as being OFDM). The graphical user interface may be designed to provide the user with signal analysis/manipulation tools appropriate for the classified burst type. In another embodiment, the computer system may output an indication of the classification to a demodulation processor, so that the demodulation processor may automatically apply the appropriate type of demodulation to the burst (i.e., DSSS demodulation for a DSSS burst, and OFDM demodulation for an OFDM burst).

In some embodiments, the action of determining whether or not the burst contains the known training sequence may include: computing a correlation function $R_2$ between the known training sequence and the samples of the burst; and determining whether or not the correlation function $R_2$ includes three peaks with: (a) amplitude greater than a second threshold $T_2$ and (b) interpeak spacing corresponding to a known symbol distance between the two repetitions of the base pattern. The action of computing the correlation function $R_2$ may be performed, e.g., as variously described above. Furthermore, the action of determining whether or not the correlation function $R_2$ includes the three peaks may be performed, e.g., as variously described above.

In some embodiments, in response to the burst being classified as corresponding to a DSSS signal, the computer system may demodulate the burst to obtain information bits. The action of demodulating the burst includes applying the Barker code to successive blocks of the samples of the input signal, e.g., as described above.

In some embodiments, in response to determining that the burst contains the known training sequence, the computer system may demodulate the burst to recover input bits. The action of demodulating the burst conforms to the OFDM standard.

Additional embodiments of the present invention are described in the following numbered paragraphs.

1. A method comprising: receiving an input signal; detecting a start location and stop location of a burst within the input signal based on an analysis of a moving-window average power signal derived from the input signal; resampling the input signal to obtain an intermediate signal; computing a correlation between a portion of the intermediate signal and a known Barker code of a direct sequence spread spectrum (DSSS) standard; determining whether or not the correlation between the DSSS Barker code and said portion includes two peaks with amplitude greater than a first threshold and separated by a sample distance equal to a known sample distance between successive DSSS symbols; and outputting a decision indicating whether or not the input signal is a DSSS signal based on a result of said determining.

2. The method of paragraph 1, wherein said determining includes: (a) locating within the correlation a first peak of largest amplitude; (b) removing from a neighborhood of the first peak any lower amplitude peaks in order to obtain a modified correlation; (c) locating within the modified correlation a second peak of second largest amplitude; (d) removing from a neighborhood of the second peak any lower amplitude peaks in order to obtain a doubly modified correlation; and (e) determining whether the first peak and the second peak have amplitude greater than the first threshold and are separated by said sample distance.

3. A method comprising: receiving an input signal; detecting a start location and stop location of a burst within the input signal based on an analysis of a moving-window average power signal derived from the input signal; resampling the input signal to obtain an intermediate signal; computing a correlation between the intermediate signal and a template, wherein the template represents a long training sequence from a preamble of a reference signal that conforms to an OFDM standard, wherein the long training sequence includes two repetitions of a base pattern; determining whether or not the correlation between the intermediate signal and the template includes three peaks with: (a) amplitude greater than a threshold and (b) interpeak spacing corresponding to a standardized symbol distance between the two repetitions of the base pattern; in response to a determination that the correlation includes said three peaks: (i) extracting a hypothesized long training sequence within the intermediate signal based on a location of a middle one of said three peaks in the correlation; (ii) performing an autocorrelation between a selected portion of the hypothesized long training sequence and a whole of the hypothesized long training sequence; and (iii) determining whether or not the autocorrelation includes two peaks with amplitude greater than a second threshold and having said interpeak spacing that corresponds to the standardized symbol distance between the two repetitions of the base pattern; outputting a decision indicating whether or not the input signal is an OFDM signal based on a result of said determining whether or not the autocorrelation includes said two peaks. (For example, an indication of the decision may be provided as output to a display device for presentation to a user.)

4. The method of paragraph 3, further comprising: in response to a decision that the input signal is an OFDM signal, searching the correlation for an additional set of three peaks with: (a) amplitude greater than the threshold and (b) interpeak spacing corresponding to the standardized symbol distance between the two repetitions of the base pattern; and in response to detecting said additional set of three peaks in the correlation, outputting an indication of the existence of an additional burst having a start time defined by a sample position of the additional set of three peaks within the correlation.

Figure 6:
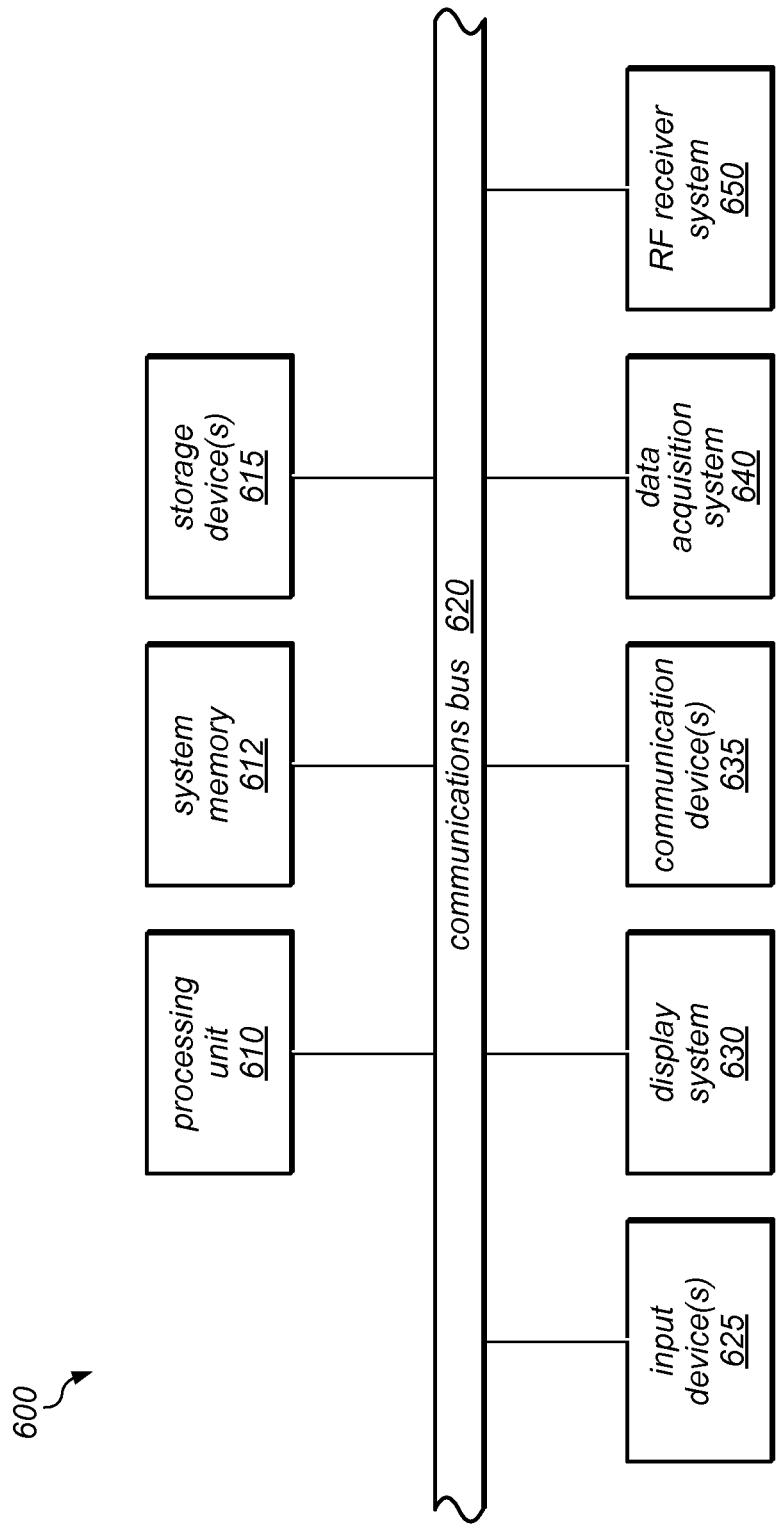
FIG. 6 illustrates one embodiment of a computer system that may be used to perform any of the method embodiments described herein.

FIG. 6 illustrates one embodiment of a computer system 600 that may be used to perform any of the method embodiments described herein, or, any combination of the method embodiments described herein, or any subset of any of the method embodiments described herein, or, any combination of such subsets.

Computer system 600 may include a processing unit 610, a system memory 612, a set 615 of one or more storage devices, a communication bus 620, a set 625 of input devices, and a display system 630.

System memory 612 may include a set of semiconductor devices such as RAM devices (and perhaps also a set of ROM devices).

Storage devices 615 may include any of various storage devices such as one or more memory media and/or memory access devices. For example, storage devices 615 may include devices such as a CD/DVD-ROM drive, a hard disk, a magnetic disk drive, magnetic tape drives, etc.

Processing unit 610 is configured to read and execute program instructions, e.g., program instructions stored in system memory 612 and/or on one or more of the storage devices 615. Processing unit 610 may couple to system memory 612 through communication bus 620 (or through a system of interconnected busses). The program instructions configure the computer system 600 to implement a method, e.g., any of the method embodiments described herein, or, any combination of the method embodiments described herein, or, any subset of any of the method embodiments described herein, or any combination of such subsets.

Processing unit 610 may include one or more processors (e.g., microprocessors).

One or more users may supply input to the computer system 600 through the input devices 625. Input devices 625 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 630 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 600 may include other devices, e.g., devices such as one or more graphics accelerators, one or more speakers, a sound card, a video camera and a video card, a global positioning system (GPS) receiver, one or more accelerometers, a radio direction-finding system.

In some embodiments, computer system 600 may include one or more communication devices 635, e.g., a network interface card for interfacing with a computer network. In one embodiment, computer system 600 may receive an input signal and perform signal-processing operations on the input signal using such a communication device.

In some embodiments, the communication devices may include a reconfigurable I/O (RIO) board that includes one or more programmable hardware elements (PHEs), one or more analog-to-digital (A/D) converters and additional circuitry. The RIO board is programmable to achieve a user-desired configuration of input and/or output processing, e.g., via a program written using LabVIEW FPGA. In some embodiments, the additional circuitry of the RIO board may include circuitry optimized for various kinds of signal processing operations and/or circuitry configured for signal amplification, carrier signal generation and synchronization, clock signal generation and synchronization, RF down-conversion, any of various kinds of demodulation, etc. The RIO board may receive an input signal, down-convert the input signal to baseband, digitize the baseband signal, and make the digitized baseband samples available to the computer system 500 for further processing, e.g., processing according to any of the method embodiments disclosed herein.

In some embodiments, the reconfigurable I/O board is one of the RIO boards provided by National Instrument Corporation.

The computer system may be configured with a software infrastructure including an operating system, and perhaps also, one or more graphics APIs (such as OpenGL®, Direct3D, Java 3D™). In some embodiments, the software infrastructure may include LabVIEW and/or LabVIEW FPGA, which are software products of National Instruments Corporation.

In some embodiments, the computer system 600 may be configured for coupling to a data acquisition system 640. The data acquisition system 640 is configured to receive analog inputs signals, to digitize the analog input signals, and to make those digitized signals available to the computer system 600. The data acquisition system 640 may operate under the control of the software executing on processor 610.

In some embodiments, the computer system 600 may be configured to interface with a receiver system 650, e.g., a receiver system designed for capturing radiated electromagnetic signals (such as RF signals, wireless LAN signals, etc.), down-converting the captured signals, and sampling the down-converted signals. In one embodiment, the receiver system 650 may be realized by a vector signal analyzer such as the NI PXIe-5663 or the NI PXIe-5663E provided by National Instruments Corporation.

Figure 7:
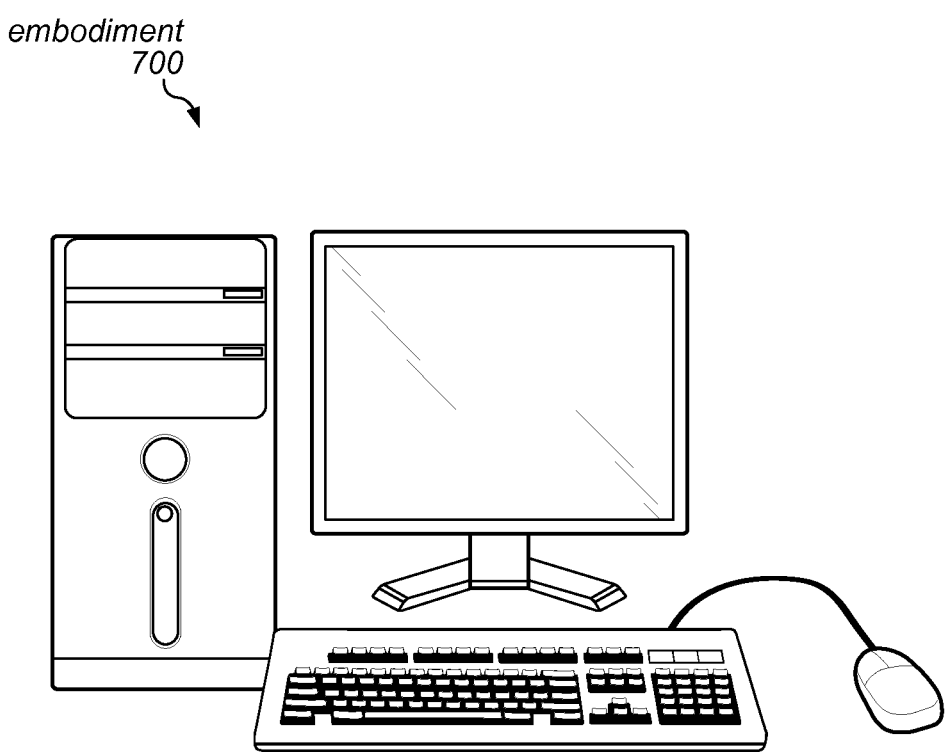
FIG. 7 illustrates one embodiment of the computer system shown in FIG. 6.

FIG. 7 illustrates one possible embodiment 700 for computer system 600.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   a computer system receiving an input signal;
   the computer system detecting a start location and stop location of a burst within the input signal based on an average power signal derived from the input signal;
   the computer system computing a correlation function based on (a) samples of the input signal corresponding to at least a portion of the burst and (b) a known Barker code of a direct sequence spread spectrum (DSSS) standard, wherein the correlation function is a function of shift index, wherein a value of the correlation function at a given value of the shift index is determined by computing inner products between respective windows of the samples and the Barker code and by computing a sum of magnitudes of the inner products, wherein the respective windows are shifted relative to an initial series of windows by an amount equal to the shift index value;
   the computer system determining whether or not the correlation function includes two peaks with amplitude greater than a first threshold and separated by a sample distance equal to a known sample distance between successive DSSS symbols;
   the computer system outputting a decision indicating whether or not the burst corresponds to a DSSS signal based on a result of said determining.

2. The method of claim 1, further comprising:
   resampling the burst to a Nyquist rate of DSSS signals conforming to the DSSS standard prior to said computing the correlation function.

3. The method of claim 1, further comprising:
   in response to determining that the correlation function includes the two peaks, demodulating the burst to obtain information bits, wherein said demodulating includes applying the Barker code to successive blocks of samples of the burst.

4. The method of claim 1, wherein the magnitudes of the inner products are the squares of the inner products.

5. The method of claim 1, wherein said detecting the start location and the stop location of the burst within the input signal includes:
   computing the average power signal by moving a sample window through the input signal and computing an average power for each position of the window through said movement.

6. The method of claim 1, wherein said determining includes:
   locating within the correlation function a first peak of largest amplitude;
   removing from a neighborhood of the first peak any lower amplitude peaks in order to obtain a modified correlation;
   locating within the modified correlation a second peak of second largest amplitude;
   determining whether the first peak and the second peak have amplitude greater than the first threshold and are separated by said sample distance.

7. A method comprising:
   a computer system receiving an input signal;
   the computer system detecting a start location and stop location of a burst within the input signal based on an average power signal derived from the input signal;
   the computer system computing a correlation function between a template and samples of the input signal corresponding to the burst, wherein the template represents a training sequence of a preamble conforming to an OFDM standard, wherein the training sequence includes two repetitions of a base pattern;
   the computer system determining whether or not the correlation function includes three peaks with: (a) amplitude greater than a threshold and (b) interpeak spacing corresponding to a known symbol distance between the two repetitions of the base pattern;
   in response to determining that the correlation function includes said three peaks, the computer system performing an autocorrelation analysis on a selected portion of the burst to determine whether or not the selected portion corresponds to an instance of the training sequence;
   the computer system outputting a decision indicating whether or not the burst corresponds to an OFDM signal based on a result of said determining whether or not the selected portion corresponds to an instance of the training sequence.

8. The method of claim 7, wherein said performing the autocorrelation analysis comprises:
   extracting a hypothesized training sequence from the burst as the selected portion of the burst, wherein said extracting is based on a location of a middle one of said three peaks in the correlation function;
   performing an autocorrelation between a subsequence of the hypothesized training sequence and a whole of the hypothesized training sequence;
   determining whether or not the autocorrelation includes two peaks with amplitude greater than a second threshold and having interpeak spacing that corresponds to said known symbol distance between the two repetitions of the base pattern.

9. The method of claim 7, further comprising:
   resampling the burst at least to the Nyquist rate of OFDM signals conforming to the OFDM standard, wherein said resampling is performed prior to said computing the correlation function.

10. The method of claim 7, further comprising:
    in response to determining that the selected portion of the burst corresponds to an instance of the training sequence, demodulating the burst to recover input bits, wherein said demodulating conforms to the OFDM standard.

11. The method of claim 7, further comprising:
    in response to a decision that the burst corresponds to an OFDM signal, searching the correlation function for an additional set of three peaks with: (a) amplitude greater than the threshold and (b) interpeak spacing corresponding to the known symbol distance between the two repetitions of the base pattern;
    and in response to detecting said additional set of three peaks in the correlation function, outputting an indication of existence of an additional burst having a start time defined by a position of the additional set of three peaks within the correlation.

12. A method comprising:
a computer system receiving an input signal;
the computer system detecting a start location and stop location of a burst within the input signal based on an average power signal derived from the input signal;
the computer system computing a first correlation function based on (a) samples of the input signal corresponding to at least a portion of the burst and (b) a known Barker code of a direct sequence spread spectrum (DSSS) standard;
the computer system determining whether or not the first correlation function includes two peaks with amplitude greater than a first threshold and separated by a sample distance equal to a known sample distance between successive DSSS symbols;
the computer system determining whether or not the burst contains a known training sequence conforming to an OFDM standard, wherein the known training sequence includes two repetitions of a base pattern; the computer system classifying the burst as corresponding to a DSSS signal, an OFDM signal or neither based on whether or not the first correlation function includes the two peaks and based on whether or not the burst contains the known training sequence.

13. The method of claim 12, further comprising: outputting an indication of said classification of the burst.

14. The method of claim 12, wherein said determining whether or not the burst contains the known training sequence includes:
computing a second correlation function between the known training sequence and the samples of the input signal corresponding to at least a portion of the burst;
determining whether or not the second correlation function includes three peaks with: (a) amplitude greater than a second threshold and (b) interpeak spacing corresponding to a known symbol distance between the two repetitions of the base pattern.

15. The method of claim 12, further comprising:
in response to the burst being classified as corresponding to a DSSS signal, demodulating the burst to obtain information bits, wherein said demodulating includes applying the Barker code to successive blocks of samples of the burst.

16. The method of claim 12, further comprising:
in response to determining that the burst contains the known training sequence, demodulating the burst to recover input bits, wherein said demodulating conforms to the OFDM standard.

17. A non-transitory computer-readable memory medium storing program instructions, wherein the program instructions, when executed by a computer system, cause the computer system to execute a method comprising:
receiving an input signal;
detecting a start location and stop location of a burst within the input signal based on an average power signal derived from the input signal;
computing a correlation function based on (a) samples of the input signal corresponding to at least a portion of the burst and (b) a known Barker code of a direct sequence spread spectrum (DSSS) standard, wherein the correlation function is a function of shift index, wherein a value of the correlation function at a given value of the shift index is determined by computing inner products between respective windows of the samples and the Barker code and by computing a sum of magnitudes of the inner products, wherein the respective windows are shifted relative to an initial series of windows by an amount equal to the shift index value;
determining whether or not the correlation function includes two peaks with amplitude greater than a first threshold and separated by a sample distance equal to a known sample distance between successive DSSS symbols;
outputting a decision indicating whether or not the burst corresponds to a DSSS signal based on a result of said determining.

18. The memory medium of claim 17, wherein the method further comprises:
in response to determining that the correlation function includes the two peaks, demodulating the burst to obtain information bits, wherein said demodulating includes applying the Barker code to successive blocks of samples of the burst.

19. The memory medium of claim 17, wherein said detecting the start location and the stop location of the burst within the input signal includes:
computing the average power signal by moving a sample window through the input signal and computing an average power for each position of the window through said movement.

20. The memory medium of claim 17, wherein said determining includes:
locating within the correlation function a first peak of largest amplitude;
removing from a neighborhood of the first peak any lower amplitude peaks in order to obtain a modified correlation;
locating within the modified correlation a second peak of second largest amplitude; determining whether the first peak and the second peak have amplitude greater than the first threshold and are separated by said sample distance.

21. A non-transitory computer-readable memory medium storing program instructions, wherein the program instructions, when executed by a computer system, cause the computer system to execute a method comprising:
receiving an input signal;
detecting a start location and stop location of a burst within the input signal based on an average power signal derived from the input signal;
computing a correlation function between a template and samples of the input signal corresponding to the burst, wherein the template represents a training sequence of a preamble conforming to an OFDM standard, wherein the training sequence includes two repetitions of a base pattern; determining whether or not the correlation function includes three peaks with: (a) amplitude greater than a threshold and (b) interpeak spacing corresponding to a known symbol distance between the two repetitions of the base pattern;
in response to determining that the correlation function includes said three peaks, performing an autocorrelation analysis on a selected portion of the burst to determine whether or not the selected portion corresponds to an instance of the training sequence;
outputting a decision indicating whether or not the burst corresponds to an OFDM signal based on a result of said determining whether or not the selected portion corresponds to an instance of the training sequence.

22. The memory medium of claim 21, wherein said performing the autocorrelation analysis comprises:
- extracting a hypothesized training sequence from the burst as the selected portion of the burst, wherein said extracting is based on a location of a middle one of said three peaks in the correlation function;
- performing an autocorrelation between a subsequence of the hypothesized training sequence and a whole of the hypothesized training sequence;
- determining whether or not the autocorrelation includes two peaks with amplitude greater than a second threshold and having interpeak spacing that corresponds to said known symbol distance between the two repetitions of the base pattern.

23. The memory medium of claim 21, wherein the method further comprises: in response to determining that the selected portion of the burst corresponds to an instance of the training sequence, demodulating the burst to recover input bits, wherein said demodulating conforms to the OFDM standard.

24. The memory medium of claim 21, wherein the method further comprises: in response to a decision that the burst corresponds to an OFDM signal, searching the correlation function for an additional set of three peaks with: (a) amplitude greater than the threshold and (b) interpeak spacing corresponding to the known symbol distance between the two repetitions of the base pattern; and in response to detecting said additional set of three peaks in the correlation function, outputting an indication of existence of an additional burst having a start time defined by a position of the additional set of three peaks within the correlation.

* * * * *

UNITED STATES PATENT AND TRADEMARK OFFICE
CERTIFICATE OF CORRECTION

PATENT NO. : 8,477,750 B2  
APPLICATION NO. : 13/109311  
DATED : July 2, 2013  
INVENTOR(S) : Agarwal et al.

Page 1 of 1

It is certified that error appears in the above-identified patent and that said Letters Patent is hereby corrected as shown below:

Title page:

Please add this paragraph after the heading Related U.S. Application Data:

-- (30) Foreign Application Priority Data  
Jul. 30, 2010    (IN) .............................. 1794/DEL/2010 --.

Signed and Sealed this  
Third Day of September, 2013

Teresa Stanek Rea  
*Acting Director of the United States Patent and Trademark Office*